(12) United States Patent
Lee et al.

(10) Patent No.: US 8,451,208 B2
(45) Date of Patent: May 28, 2013

(54) ORGANIC LIGHT EMITTING DISPLAY DEVICE AND METHOD OF DRIVING THE SAME

(75) Inventors: Kyoung-Soo Lee, Suwon-si (KR); Wook Lee, Suwon-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 638 days.

(21) Appl. No.: 12/319,624

(22) Filed: Jan. 7, 2009

(65) Prior Publication Data

US 2009/0219236 A1 Sep. 3, 2009

(30) Foreign Application Priority Data

Mar. 3, 2008 (KR) .................. 10-2008-0019583

(51) Int. Cl.
*G09G 3/36* (2006.01)
*G06F 3/038* (2006.01)
*G09G 5/00* (2006.01)

(52) U.S. Cl.
CPC *G09G 3/36* (2013.01); *G06F 3/038* (2013.01); *G09G 5/00* (2013.01)
USPC ............ 345/99; 345/94; 345/95; 345/98; 345/204; 345/208

(58) Field of Classification Search
USPC ............ 345/94, 95, 98–100, 204, 208, 209, 345/82, 83; 348/443
See application file for complete search history.

(56) References Cited

U.S. PATENT DOCUMENTS

| 6,351,076 B1 * | 2/2002 | Yoshida et al. ............ 315/169.1 |
| 2005/0152687 A1 * | 7/2005 | Osawa et al. ................. 386/111 |
| 2006/0007072 A1 * | 1/2006 | Choi et al. ....................... 345/76 |

FOREIGN PATENT DOCUMENTS

| JP | 2006-349930 | 12/2006 |
| KR | 10-2004-0068419 A | 7/2004 |
| KR | 10-2005-0005672 A | 1/2005 |
| KR | 10-2007-0071496 | 7/2007 |
| KR | 10-2007-0098419 A | 10/2007 |

OTHER PUBLICATIONS

Office Action for corresponding KR Application No. 10- 2008-0019583 dated Apr. 27, 2009.
Office Action of European Patent Application No. 09154075.7 dated Jun. 5, 2009.

\* cited by examiner

*Primary Examiner* — Bipin Shalwala
*Assistant Examiner* — Ilana Spar
(74) *Attorney, Agent, or Firm* — Knobbe, Martens, Olson & Bear LLP

(57) ABSTRACT

An organic light emitting display device is disclosed. The device has a drive circuit which generates a reference clock to be used for synchronizing data signals supplied to the pixels. The reference clock is based on the frame frequency. As a result, the display will provide images of consistent quality which do not vary with input data frequency.

20 Claims, 4 Drawing Sheets

ORGANIC LIGHT EMITTING DISPLAY DEVICE AND METHOD OF DRIVING THE SAME

CROSS-REFERENCE TO RELATED APPLICATIONS

This application claims the benefit of Korean Patent Application No. 10-2008-0019583, filed on Mar. 3, 2008, in the Korean Intellectual Property Office, the disclosure of which is incorporated herein by reference.

BACKGROUND

1. Field

The field relates to an organic light emitting display device and a method of driving the same, and more particularly to an organic light emitting display device having uniform luminance characteristics regardless of the driving frequency, and a method of driving the same.

2. Description of the Related Technology

In recent years, various flat panel displays have been developed which are light-weight and small-sized when compared with cathode ray tubes. Particularly, an organic light emitting display device has become popular because the organic light emitting display device has excellent luminance and color purity. The organic light emitting display uses an organic compound as a light emitting material.

An organic light emitting display device is thin, light-weight and driven at a low power consumption, and therefore it is expected that the organic light emitting display device may be widely used in the field of various display devices.

However, the organic light emitting display device may display images with different luminances despite receiving the same data signal. The luminance can depend on the time that a data signal is supplied to (or charged in) the pixels.

For example, when the organic light emitting display device is driven using an NTSC (National Television Systems Committee) signal having a driving frequency of 60 Hz, the time that each data signal is supplied to the pixels is less than that when the organic light emitting display device is driven using a PAL (Phase Alternation by Line) signal having a driving frequency of 50 Hz. This results in the overall deterioration in the luminance of images.

In particular, in the case of the organic light emitting display device having no frame memory in a drive IC, a data signal may be output from a drive circuit unit to the pixels since the data signal is synchronized with a synchronizing signal corresponding to the driving frequency. Therefore, the time that a data signal is supplied to the pixels varies according to the driving frequency.

That is to say, when the same organic light emitting display devices are driven with drive modes having different driving frequencies, the luminance varies according to driving frequency.

Also, when a separate drive circuit unit is used for each driving frequency to realize uniformity of luminance across the drive modes, the manufacturing cost is high and the manufacturing efficiency is low.

Therefore, there is an increasing demand for an organic light emitting display device and a method of driving the same that may apply to various drive modes having different driving frequencies so as to display an image with uniform luminance regardless of the driving frequencies.

SUMMARY OF CERTAIN INVENTIVE ASPECTS

One aspect is an organic light emitting display device. The display includes a pixel unit having a plurality of pixels disposed near intersection points of scan lines and data lines, and a drive circuit unit configured to supply a scan signal and a data signal to the scan lines and the data lines, respectively. The scan signal and the data signal are supplied according to a frame frequency, wherein the drive circuit unit generates a reference clock corresponding to received synchronizing signals, and the reference clock has a frequency based on the frame frequency. The drive circuit controls the time that the data signal is supplied to the pixels according to the reference clock.

Another aspect is a method of driving an organic light emitting display device. The method comprises receiving a synchronizing signal, generating a reference clock according to the synchronizing signal, where the reference clock has a frequency based on a frame frequency, and controlling the time that a data signal is supplied to pixels according to the reference clock.

Another aspect is an organic light emitting display device, comprising a pixel unit including a plurality of pixels, and a drive circuit unit configured to receive data at a data frequency and a reference clock, and to generate a scan signal and a data signal based on the received data, and to the supply the scan signal and the data signal to the pixels according to the reference clock.

BRIEF DESCRIPTION OF THE DRAWINGS

The accompanying drawings, together with the specification, illustrate exemplary embodiments.

DETAILED DESCRIPTION OF CERTAIN INVENTIVE EMBODIMENTS

Figure 1:
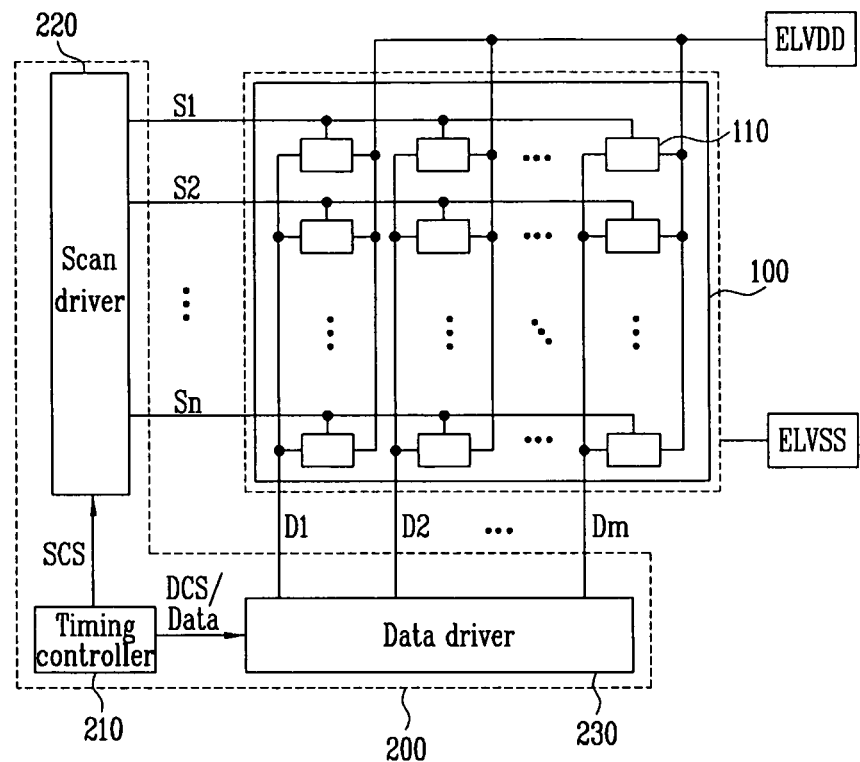
FIG. 1 is a block diagram showing a configuration of an organic light emitting display device according to one exemplary embodiment.

Korean Patent Application No. 2008-0019583, filed on Mar. 3, 2008, in the Korean Intellectual Property Office, and entitled: "Organic Light Emitting Display Device and Driving Method Thereof" is incorporated by reference herein in its entirety.

Hereinafter, certain exemplary embodiments will be described with reference to the accompanying drawings. When a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals generally refer to like elements throughout.

FIG. 1 is a block diagram showing a configuration of an organic light emitting display device according to one exemplary embodiment.

Referring to FIG. 1, the organic light emitting display device includes a pixel unit 100 and a drive circuit unit 200 to drive the pixel unit 100.

The pixel unit 100 includes a plurality of pixels 110 disposed at intersection points of scan lines (S1 to Sn) and data lines (D1 to Dm).

The pixels 10 receive a data signal from the data lines (D1 to Dm) when a scan signal is supplied from the scan lines (S1 to Sn). The pixels 110 further receives first and second pixel power sources (ELVDD and ELVSS) from, for example, a power supply unit (not shown). Each of the pixels 110 includes an organic light emitting diode (not shown) that emits light with luminance corresponding to the data signal (data voltage or data current).

Therefore, the pixel unit 100 displays an image to corresponding to the data signal.

The drive circuit unit 200 supplies a scan signal and a data signal to the scan lines (S1 to Sn) and the data lines (D1 to Dm), respectively. For this purpose, the drive circuit unit 200 includes a timing controller 210, a scan driver 220, and a data driver 230.

The timing controller 210 generates a scan drive control signal (SCS) and a data drive control signal (DCS) to correspond to received synchronizing signals. The scan drive control signal (SCS) generated in the timing controller 210 is supplied to the scan driver 220, and the data drive control signal (DCS) is supplied to the data driver 230. Here, the scan drive control signal (SCS) may include a gate start pulse, a gate shift clock, a gate output enable signal, and other signals. A data drive control signal (DCS) may include a source start pulse, a source shift clock, a source output enable signal, and other signals. The timing controller 210 may directly transmit at least some of the synchronizing signals to the scan driver 220 and/or the data driver 230. Also, the timing controller 210 supplies received data (Data) to the data driver 230.

The scan driver 220 receives a scan drive control signal (SCS) from the timing controller 210 to generate a scan signal. The scan signal generated in the scan driver 220 is sequentially supplied to the scan lines (S1 to Sn).

The data driver 230 receives a data drive control signal (DCS) and data (Data) from the timing controller 210 to generate a data signal. The data signal generated in the data driver 230 is supplied to the data lines (D1 to Dm) synchronized with the scan signal. That is to say, the data driver 230 supplies one line (one row) of the data signal during every horizontal period.

The data signal supplied to the data lines (D1 to Dm) is supplied to the pixels 110 selected by the scan signal. Then, each of the pixels 110 displays an image by emitting light with luminance corresponding to the data signal.

However, the emission luminance of the pixels 110 may be related to the time that a data signal is supplied to the pixels 110.

This occurs because the time that a data signal is charged in the capacitors that are present in the data lines (D1 to Dm) and/or the pixels 110 varies according to the time that a data signal is supplied to the pixels 110, which changes the voltage stored in the capacitor. The pixels 110 emits the light corresponding to the voltage stored in the capacitor. Therefore, although the same data signal is supplied to the pixels 110, the emission luminance of the pixels 110 may vary according to the time that the data signal is supplied to the pixels 110.

Therefore, when the pixel unit 100 has a high driving frequency, a first horizontal period is shortened, and therefore the emission luminance of the pixels 110 is relatively low. When the pixel unit 100 has a low driving frequency, the first horizontal period is lengthened, and therefore the emission luminance of the pixels 110 is relatively high.

As a result, when the organic light emitting display device is driven using a drive mode having different driving frequencies, the luminance characteristics of the organic light emitting display device may be made non-uniform. Therefore, the frequency range of the conventional organic light emitting display devices is restricted since various drive mode of different driving frequencies may not be applied to the conventional organic light emitting display devices.

An organic light emitting display device that controls the time that a data signal is supplied to the pixels 110 to correspond to the frame frequency instead of the driving frequency will not have luminance which varies with driving frequency.

In the organic light emitting display device according to one exemplary embodiment, the drive circuit unit 200 may generate a reference clock having the frame frequency, and may control the time that the data signal is supplied to the pixels 110 to correspond to the reference clock.

For example, the reference clock may be set to be generated in the timing controller 210 to correspond to the frame frequency when a synchronizing signal, for example, a horizontal synchronizing signal (Hsync), is supplied thereto. A control signal to control the time that the data signal is supplied to pixels 110 is generated to correspond to the reference clock. The scan driver 220, the data driver 230, and/or the pixel unit 100 may be controlled by the control signal to finally control the time that the data signal is supplied to the pixels 110.

Figure 2:
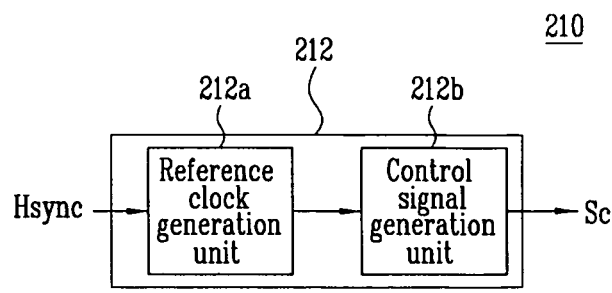
FIG. 2 is a block diagram partially showing a configuration of a timing controller shown in FIG. 1.

For this purpose, the timing controller 210 according to this exemplary embodiment includes components shown in FIG. 2.

FIG. 2 is a block diagram partially showing a configuration of a timing controller shown in FIG. 1. A configuration of a reference clock and a timing controller to generate a control signal corresponding to the reference clock are shown in FIG. 2.

Referring to FIG. 2, the timing controller 210 includes a reference clock generation unit 212a; and a control block 212 including a control signal generation unit 212b.

The reference clock generation unit 212a generates a reference clock that is set in a constant phase with respect to the frame frequency of the externally supplied synchronizing signals, for example the horizontal synchronizing signal (Hsync). For example, the reference clock generation unit 212a is driven when the horizontal synchronizing signal (Hsync) is supplied, thereby generating a uniform reference clock coinciding with the frame frequency regardless of the driving frequency of the pixel unit.

Here, the frame frequency may be one frequency value or, for example, may be one of two selective frequency values, but is at least the minimum frequency value. In particular, the highest frame frequency among a plurality of functional frame frequencies may be a reference frequency, the frame frequencies being included in a frequency range in which the pixel unit may be driven. Accordingly, there is a limitation on the time that a data signal may be supplied to the pixels since the first horizontal period is based at least in part on frame frequency.

For example, assume that the pixel unit is driven with a driving frequency of 50 Hz or 60 Hz, and the reference clock may set the frame frequency of 60 Hz to the reference frequency.

The reference clock generated in the reference clock generation unit 212a is supplied to the control signal generation unit 212b.

The control signal generation unit 212b generates control signal (Sc) to control the time that a data signal is supplied to the pixels to correspond to the reference clock. The control signal (Sc) is supplied to at least one of the scan driver 220, the data driver 230, and the pixel unit 100, as shown in FIG. 1, to control them. Therefore, the time that the data signal is supplied to the pixels is controlled uniformly.

Meanwhile, it is shown in FIG. 2 that the reference clock generation unit 212a and the control signal generation unit 212b are provided in the timing controller 210, but it may be considered that that the reference clock generation unit 212a and the control signal generation unit 212b may be provided in the scan driver 220 and/or the data driver 230 as shown in FIG. 1 according to various embodiments.

Because the reference clock generation unit 212a and the control signal generation unit 212b are provided in the drive circuit unit 200, the time that the data signal is supplied to the pixels is controlled to be a time corresponding to the frame frequency regardless of the driving frequency.

As described above, the organic light emitting display device according to one exemplary embodiment as shown in FIGS. 1 and 2 may be useful to maintain the constant time that a data signal is supplied to the pixels by generating a reference clock coinciding with the frame frequency regardless of the driving frequency. Therefore, it is possible to maintain the uniform luminance characteristics although the driving frequency is changed.

Therefore, it is possible to realize the organic light emitting display device having uniform luminance characteristics in all drive modes of different driving frequencies. As a result, the useful frequency range of the organic light emitting display device may be enhanced, the manufacturing cost may be reduced and the manufacturing efficiency may be improved.

Figure 3:
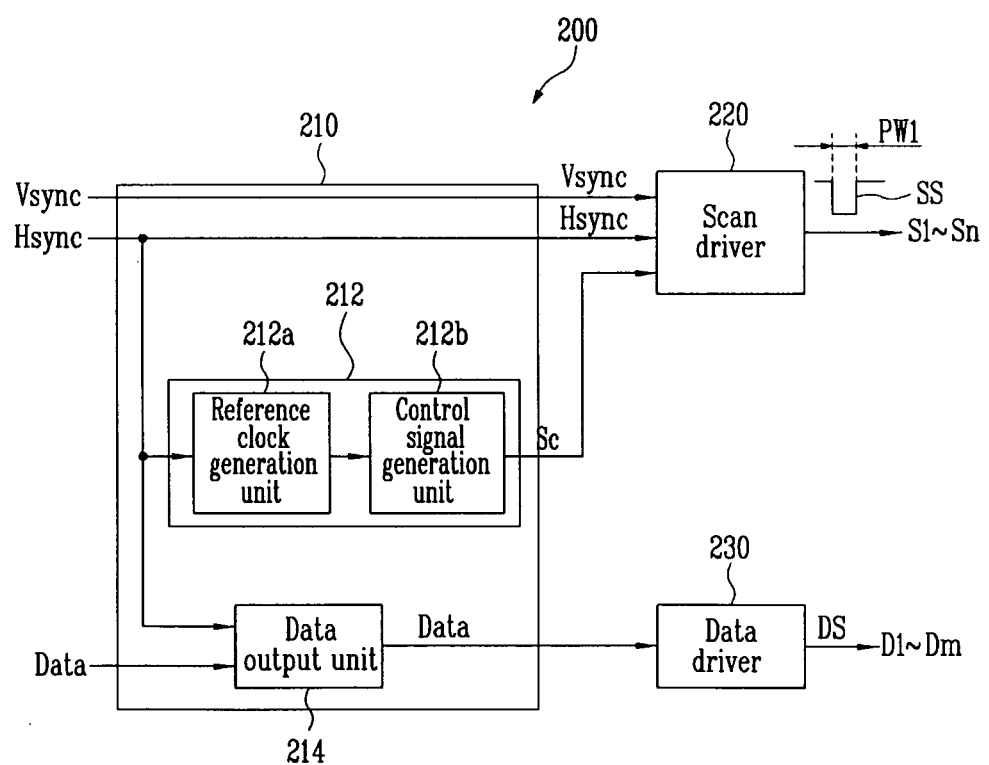
FIG. 3 is a block diagram showing a configuration of a drive circuit unit according to an exemplary embodiment.

FIG. 3 is a block diagram showing a configuration of a drive circuit unit according to an embodiment. Some components of the drive circuit are similar to those described above with reference to FIGS. 1 and 2.

Referring to FIG. 3, in the drive circuit unit 200, the timing controller 210 supplies a vertical synchronizing signal (Vsync) and a horizontal synchronizing signal (Hsync), and supplies a control signal (Sc) generated in the control block 212 to the scan driver 220. Also, although not shown, the timing controller 210 may generate various scan drive control signals and further supply the generated scan drive control signals to the scan driver 220.

Then, the scan driver 220 generates a scan signal (SS) to correspond to the vertical synchronizing signal (Vsync), the horizontal synchronizing signal (Hsync) and the control signal (Sc), and sequentially supplies the generated scan signal (SS) to the pixels through the scan lines (S1 to Sn).

A pulse width (PW1) of the scan signal (SS) generated in the scan driver 220 may correspond to the control signal (Sc).

For example, a pulse width of a sampling signal generated in a shift register unit (not shown) may be controlled by setting the control signal (Sc) to an input signal of the shift register unit provided in the scan driver 220.

Also, the control signal (Sc) is input into a signal generation unit (not shown) generating a scan signal by combining the sampling signal output from the shift register unit with a gate output enable signal, etc. Therefore, the control signal (Sc) may control a pulse width of the scan signal (SS). For this purpose, a logic circuit, such as an AND gate, that operates by receiving a control signal (Sc) may be further provided in the signal generation unit.

However, this shows a confirmation and a method in which the control signal (Sc) controls a pulse width (PW1) of the scan signal (SS) generated in the scan driver 220 in the aspect of the exemplary embodiments, but other embodiments are also possible. That is to say, the confirmation and method in which the control signal (Sc) controls a pulse width (PW1) of the scan signal (SS) may be widely varied.

The timing controller 210 may further include a data output unit 214 to output data (Data) to the data driver 230 to correspond to a synchronizing signal such as a horizontal synchronizing signal (Hsync). Also, although not shown, the timing controller 210 may generate various data drive control signals and further supply the generated data drive control signals to the data driver 230.

The data driver 230 receiving data (Data) and data drive control signals from the timing controller 210 generates a data signal (DS) to correspond to the received data (Data) and data drive control signals.

The data signal (DS) generated in the data driver 230 is output to the data lines (D1 to Dm).

Also, the data signal (DS) output to the data lines (D1 to Dm) is supplied to the pixels while scan signal (SS) is supplied to the pixels.

However, the pulse width (PW1) of the scan signal (SS) is controlled to correspond to the control signal (Sc) in this exemplary embodiment, and the pulse width (PW1) of the scan signal (SS) is set to correspond to the reference clock since the control signal (Sc) is generated to correspond to the reference clock.

Therefore, the pulse width (PW1) of the scan signal (SS) is controlled to correspond to the frame frequency.

Therefore, the time that the data signal (DS) output into the data lines (D1 to Dm) is supplied to the pixels is controlled and is independent of the driving frequency of the pixel unit.

Figure 4:
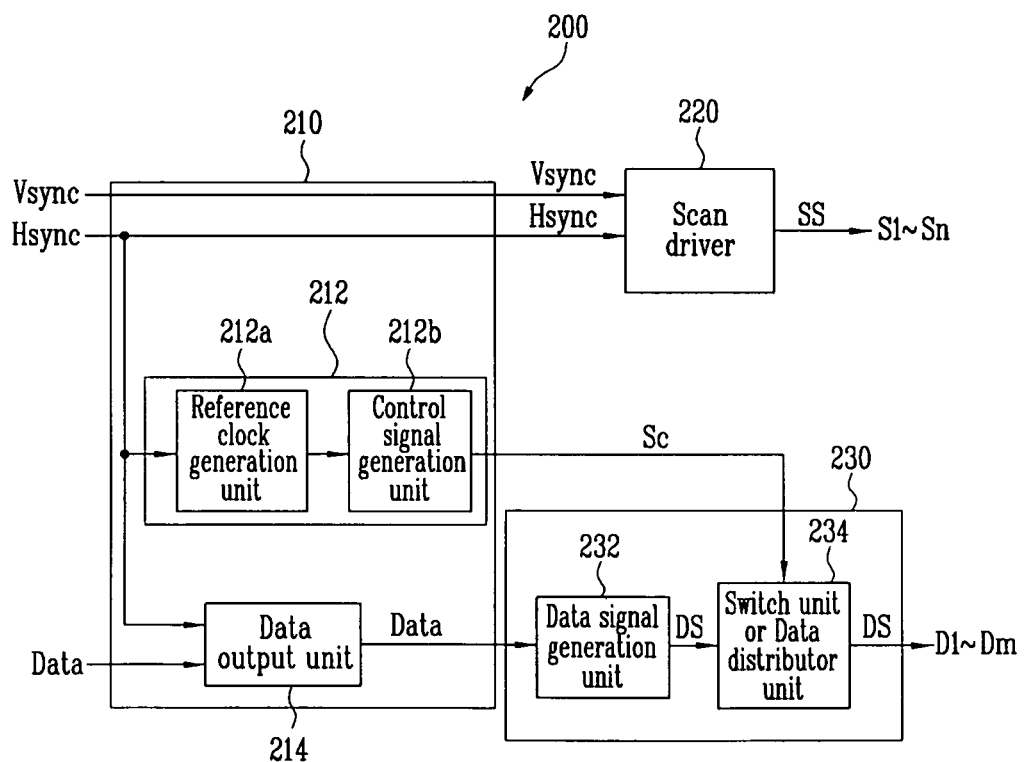
FIG. 4 is a block diagram showing a configuration of a drive circuit unit according to an exemplary embodiment.

FIG. 4 is a block diagram showing a configuration of a drive circuit unit according to another exemplary embodiment. Some of the components of the drive circuit unit of FIG. 4 are similar to the components described above with reference to FIGS. 1 to 3.

Referring to FIG. 4, a control signal (Sc) is supplied to the data driver 230. The data driver 230 controls the time that a data signal is output to the data lines (D1 to Dm) to correspond to the control signal (Sc). Here, since the control signal (Sc) is generated to correspond to the reference clock, the time that the data signal is output into the data lines (D1 to Dm) is set to a regular value to correspond to the reference clock.

For example, the data driver 230 includes a data signal generation unit 232 and a switch unit (or a data distributor unit) 234, and the control signal (Sc) may be supplied to the switch unit (or a data distributor unit) 234.

The data signal generation unit 232 generates a data signal (DS) corresponding to the data (Data) and data drive control signals supplied from the timing controller 210. The data signal (DS) generated in the data signal generation unit 232 is supplied to a switch unit (or a data distributor unit) 234.

The switch unit (or a data distributor unit) 234 outputs the data signal (DS) from the data signal generation unit 232 into the data lines (D1 to Dm) corresponding to the control signal (Sc) supplied from the timing controller 210. For example, the switch unit (or a data distributor unit) 234 may output a data signal (DS) to the data lines (D1 to Dm) in a period that a scan signal (SS) is supplied.

For this purpose, a plurality of switches to control the transmission of the data signal (DS) may be provided inside the switch unit (or a data distributor unit) 234. Control electrodes of switches are coupled to a supply line of the control signal (Sc), and therefore the switches may transmit the data signal (DS) to the data lines (D1 to Dm) during a period corresponding to the control signal (Sc).

For example, the switch unit 234 is a data distributor unit (Demux) that distributes and outputs the data signal (DS) to data lines (D) of red, green and blue subpixels, the control signal (Sc) may be set to red, green and blue clock signals (CLR, CLG, CLB). Meanwhile, it is shown in FIG. 4 that the switch unit (or a data distributor unit) 234 is included in the data driver 230, but it may be considered that the switch unit (or a data distributor unit) 234 is separate from the data driver 230 according to some embodiments.

A switch unit (or data distributor unit) 234, which is disposed between the data signal generation unit 232 and the data lines (D1 to Dm) to control the time that a data signal (DS) is output to the data lines (D1 to Dm) by the control signal (Sc), is provided in this exemplary embodiment. Therefore, the time that a data signal (DS) is supplied to the pixels may be controlled independently of the driving frequency of the pixel unit.

In addition, although not shown, the control signal (Sc) may be directly supplied to the pixel unit 100 of FIG. 1. In this case, switching elements may be provided in the pixels, the switching elements being turned on or off according to the control signal (Sc) to control the time that the data signal (DS) supplied to the data lines (D1 to Dm) is supplied to the pixels.

Figure 5A:
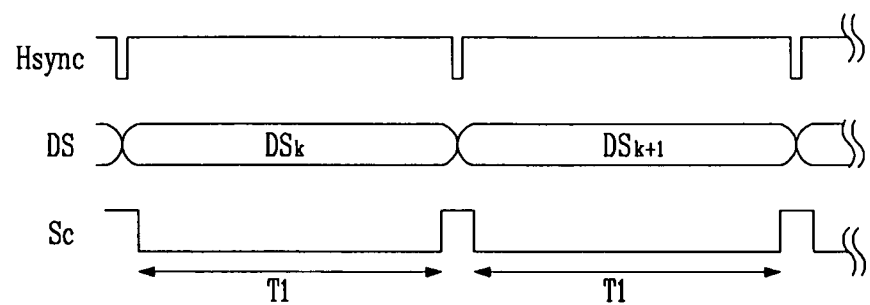
FIGS. 5A and 5B are timing views showing an operation of the drive circuit unit.
Figure 5B:
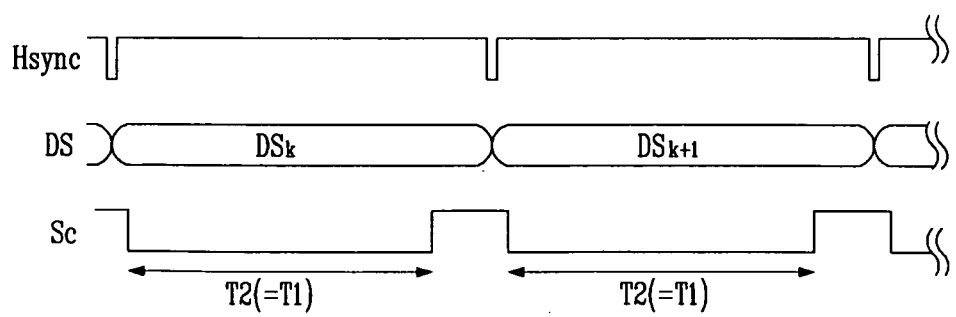

FIGS. 5A and 5B are timing views showing an operation of the drive circuit unit. FIG. 5A shows a synchronizing signal (a horizontal synchronizing signal (Hsync) and the like) having a driving frequency of 60 Hz supplied to the drive circuit unit, and FIG. 5B shows a synchronizing signal with a driving frequency of 50 Hz supplied to the drive circuit unit.

Comparing FIG. 5A and FIG. 5B, the frequency of the horizontal synchronizing signal (Hsync) and the time that a data signal (DS) is generated in the data driver and outputted from the data driver are different according to the driving frame frequency, but the times (T1 and T2) that a data signal (DS) is supplied to the pixels by the control signal (Sc) is set to substantially the same time value.

The time that a data signal (DS) is supplied from the drive circuit unit to the pixels may be a constant time value regardless of the driving frequency.

Accordingly, the organic light emitting display device may be useful to support all of the various drive modes having different driving frequencies since the organic light emitting display device has uniform luminance characteristics regardless of the driving frequency.

While various embodiments have been described, it is to be understood that the invention is not limited to the disclosed embodiments, but, on the contrary, is intended to cover various modifications and equivalent arrangements.

What is claimed is:

1. An organic light emitting display device, comprising:
    a plurality of scan lines;
    a plurality of data lines;
    a pixel unit including a plurality of pixels, each pixel connected to the scan lines and the data lines; and
    a drive circuit unit configured to receive a first synchronizing signal having a first frequency, and to supply a scan signal and a data signal to the scan lines and the data lines, respectively, wherein the scan signal and the data signal are supplied at a frequency determined by the frequency of the received synchronizing signal, and wherein the data signal is supplied to the pixels only for a duration,
    wherein the drive circuit unit is further configured to receive a second synchronizing signal having a second frequency different from the first frequency, and to supply a scan signal and a data signal to the scan lines and the data lines, respectively, wherein the scan signal and the data signal are supplied at a frequency determined by the frequency of the second synchronizing signal, and wherein the data signal is supplied to the pixels only for the duration which remains constant regardless of the first and second frequencies.

2. The organic light emitting display device according to claim 1, wherein the drive circuit unit is configured to generate a reference clock in response to the received synchronizing signal, the reference clock having a frequency based on the frequency of the synchronizing signal, and wherein the drive circuit controls the duration that the data signal is supplied to the pixels according to the reference clock.

3. The organic light emitting display device according to claim 2, wherein the drive circuit unit comprises:
    a timing controller to generate the reference clock; and
    a scan driver to generate the scan signal having a pulse width corresponding to the reference clock.

4. The organic light emitting display device according to claim 2, wherein the drive circuit unit comprises:
    a timing controller to generate the reference clock; and
    a data driver to supply the data signal to the data lines during a period corresponding to the reference clock.

5. The organic light emitting display device according to claim 2, wherein the drive circuit unit comprises:
    a timing controller to generate the reference clock;
    a data signal generation unit to generate the data signal; and
    a data distributor unit to distribute and output the data signal into the data lines,
    wherein the data distributor unit is configured to control the duration that the data signal is output to the data lines according to a control signal corresponding to the reference clock.

6. The organic light emitting display device according to claim 1, wherein the duration of the data signal is based on a highest selectable frequency of the synchronizing signal.

7. The organic light emitting display device according to claim 2, wherein the drive circuit unit receives a vertical synchronizing signal and a horizontal synchronizing signal, and generates the reference clock in response to the horizontal synchronizing signal.

8. A method of driving an organic light emitting display device having a plurality of pixels, a plurality of scan lines and a plurality of data lines, the method comprising:
    receiving a first synchronizing signal;
    generating a data signal having a frequency determined by the first synchronizing signal, wherein the data signal is supplied to the pixels for a duration;
    receiving a second synchronizing signal having a second frequency different from the first frequency; and
    supplying a scan signal and a data signal to the scan lines and the data lines, respectively,
    wherein the scan signal and the data signal are supplied at a frequency determined by the frequency of the second synchronizing signal, and wherein the data signal is supplied to the pixels only for the duration which remains constant regardless of the first and second frequencies.

9. The method of driving an organic light emitting display device according to claim 8, further comprising:
    generating a control signal that controls the duration that the data signal is supplied to the pixels;
    generating a scan signal having a pulse width corresponding to the control signal; and
    supplying the scan signal to the pixels.

10. The method of driving an organic light emitting display device according to claim 8, further comprising:
    generating a control signal that controls the duration that the data signal is supplied to the pixels; and
    supplying the data signal to the pixels according to the control signal.

11. The method of driving an organic light emitting display device according to claim 8, wherein the duration that the data signal is supplied to the pixels is based on a highest selectable frequency of the synchronizing signal.

12. An organic light emitting display device, comprising:
a pixel unit including a plurality of pixels; and
a drive circuit unit configured to receive a first synchronizing signal having a first frequency, and a reference clock having the same frequency as the first synchronizing signal, and to generate a scan signal and a data signal based on the reference clock and based on the frequency of the first synchronizing signal, wherein the data signal is supplied to the pixels for a duration,
wherein the drive circuit unit is further configured to receive a second synchronizing signal having a second frequency different from the first frequency, and to supply a scan signal and a data signal to the scan lines and the data lines, respectively, wherein the scan signal and the data signal are supplied at a frequency determined by the frequency of the second synchronizing signal, and wherein the data signal is supplied to the pixels only for the duration which remains constant regardless of the first and second frequencies.

13. The device of claim 12, wherein the drive circuit receives data at a frequency different from frame frequency of the reference clock.

14. The device of claim 12, wherein the drive circuit generates the scan signal with an active time corresponding to the reference clock.

15. The device of claim 12, wherein the reference clock has a frequency corresponding to a frame frequency.

16. The device of claim 12, wherein the drive circuit generates the data signal with an active time based on the reference clock.

17. The device of claim 12, wherein the drive circuit generates the scan signal with an active time corresponding to a highest selectable frequency of the synchronizing signal.

18. The device of claim 12, wherein the reference clock has a frequency corresponding to a highest selectable frequency of the synchronizing signal.

19. The organic light emitting display device according to claim 2, wherein the drive circuit unit comprises:
a timing controller including a reference clock generation unit configured to generate the reference clock in response to the synchronizing signal; and
a control signal generation unit configured to generate a control signal that controls the duration that the data signal is supplied to the pixels according to the reference clock.

20. The method of claim 8, further comprising:
generating a reference clock in response to the synchronizing signal, the reference clock having a frequency based on the frequency of the synchronizing signal; and
controlling the duration that the data signal is supplied to the pixels according to the reference clock.

* * * * *